United States Patent [19]

Billeter

[11] 4,241,759
[45] Dec. 30, 1980

[54] SLOW CLOSING FAUCET

[75] Inventor: Henry R. Billeter, Marco Island, Fla.

[73] Assignee: Sloan Valve Company, Franklin Park, Ill.

[21] Appl. No.: 937,045

[22] Filed: Aug. 28, 1978

[51] Int. Cl.³ .................... F16K 11/18; F16K 31/12
[52] U.S. Cl. ........................... 137/636.4; 137/454.5; 251/38; 251/45; 251/51; 251/DIG. 1
[58] Field of Search .............. 251/45, 47, 50, 51, 251/DIG. 1, 38; 137/636.4, 454.5, 636, 636.2, 636.3

[56] References Cited

U.S. PATENT DOCUMENTS

| 1,961,469 | 6/1934 | West et al. | 251/51 |
|---|---|---|---|
| 2,115,383 | 4/1938 | Christensen | 251/DIG. 1 |
| 2,772,067 | 11/1956 | Wilson | 251/45 |
| 2,988,110 | 6/1961 | Thomas | 137/636.4 |
| 2,991,795 | 7/1961 | Fraser et al. | 137/454.5 |
| 3,012,582 | 12/1961 | Russel | 137/636.2 |
| 3,348,561 | 10/1967 | MacLennan | 137/636.4 |
| 3,680,582 | 8/1972 | Pauluikonis | 251/DIG. 1 |
| 3,760,839 | 9/1973 | Hyde | 251/45 |
| 3,870,080 | 3/1975 | Landwehr | 137/636.4 |

*Primary Examiner*—Martin P. Schwadron
*Assistant Examiner*—A. Michael Chambers
*Attorney, Agent, or Firm*—Kinzer, Plyer, Dorn & McEachran

[57] ABSTRACT

Slow closing faucet control cartridge for removably mounting in a faucet casing. The depression of an operating knob activates the faucet and rotation of the knob permits the mixing of hot and cold water inlets.

8 Claims, 17 Drawing Figures

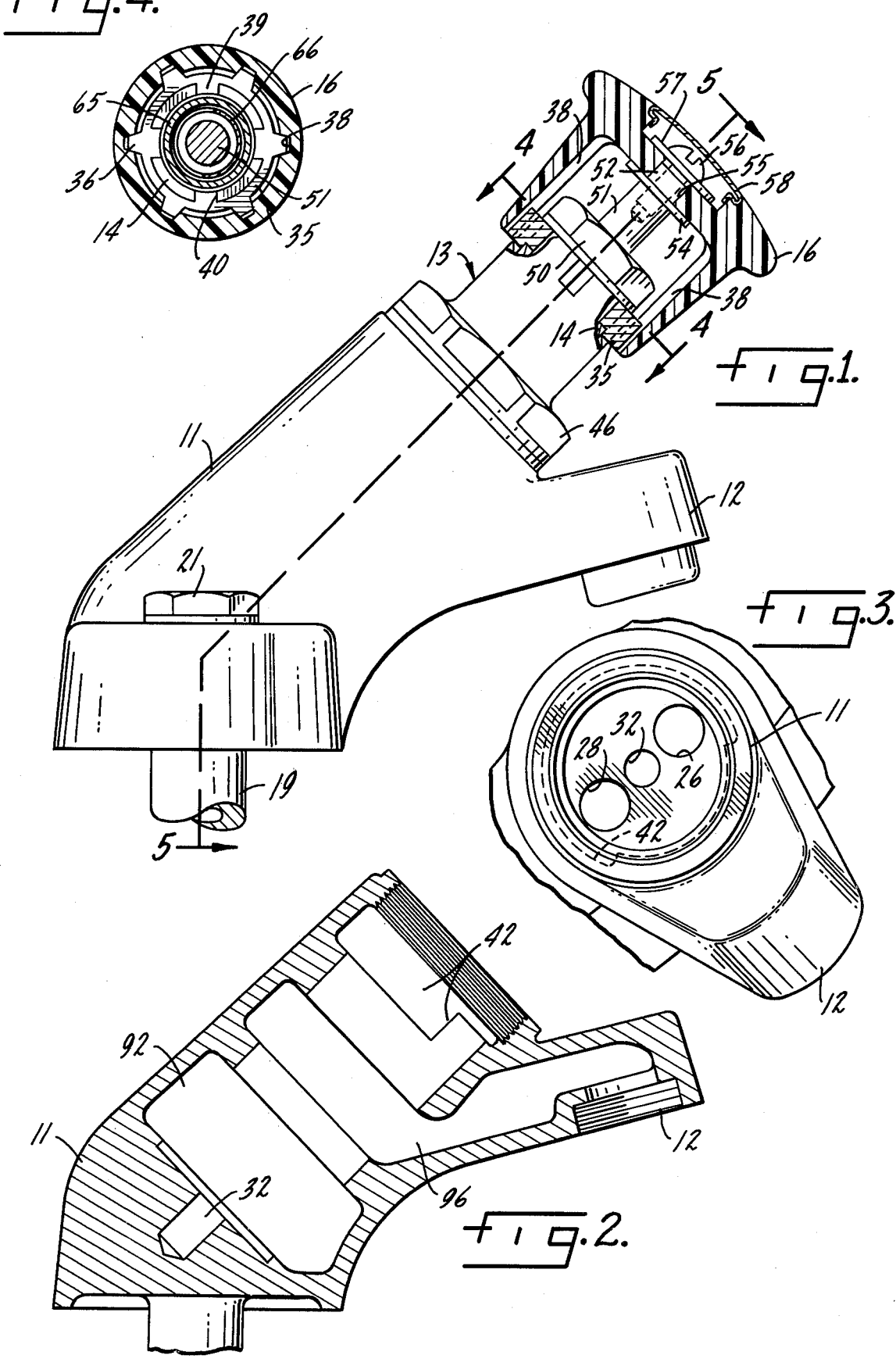

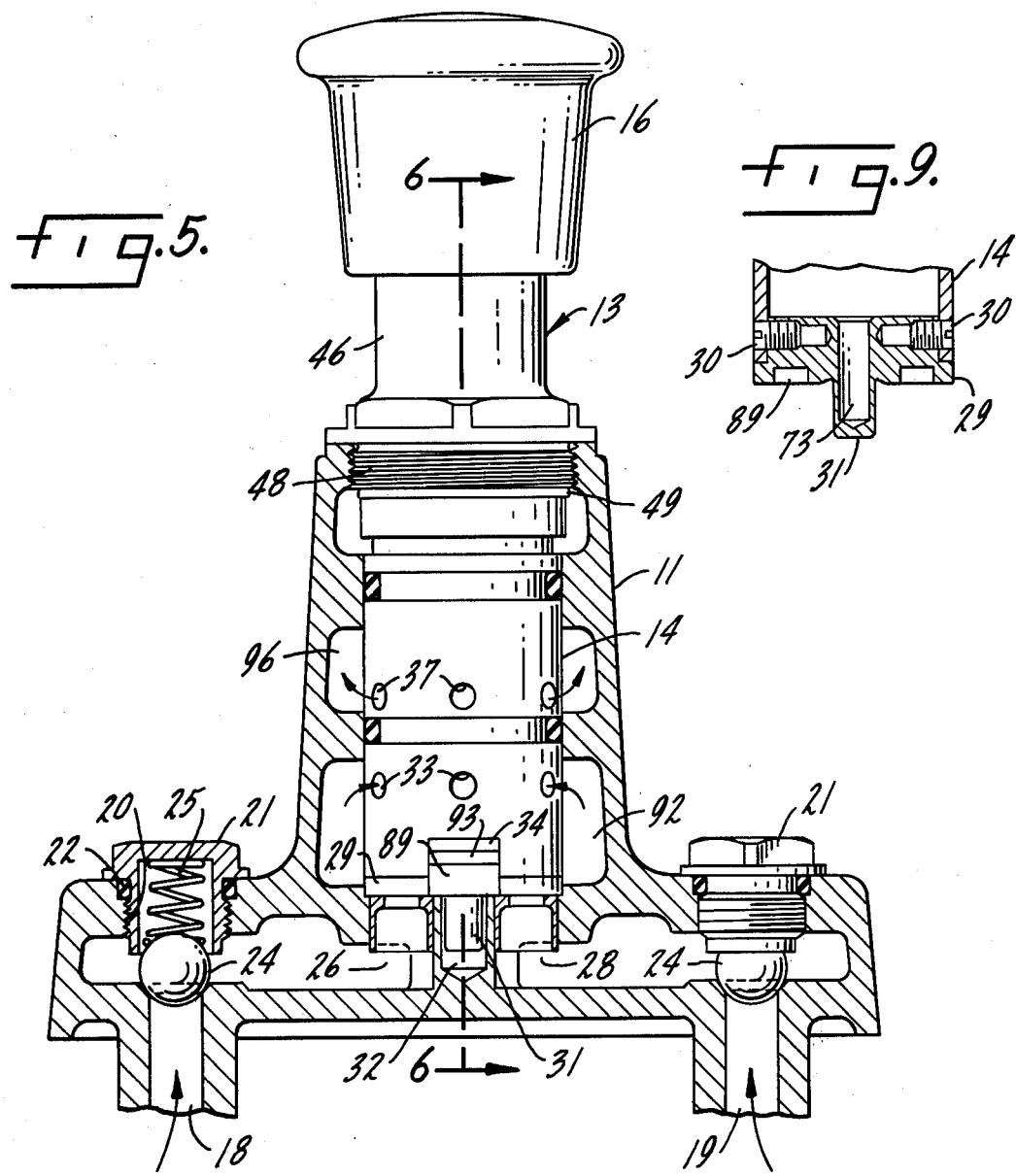
fig.5.
fig.9.
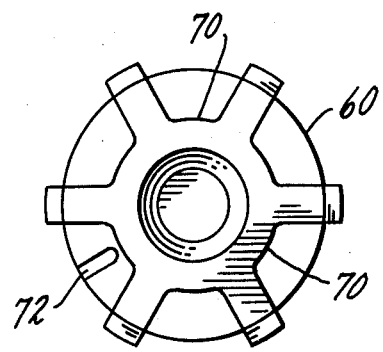
fig.10.
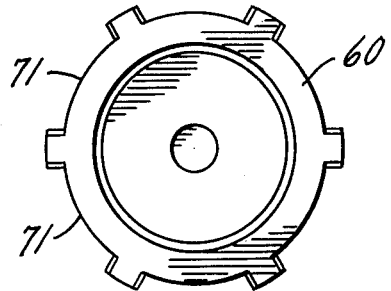
fig.11.

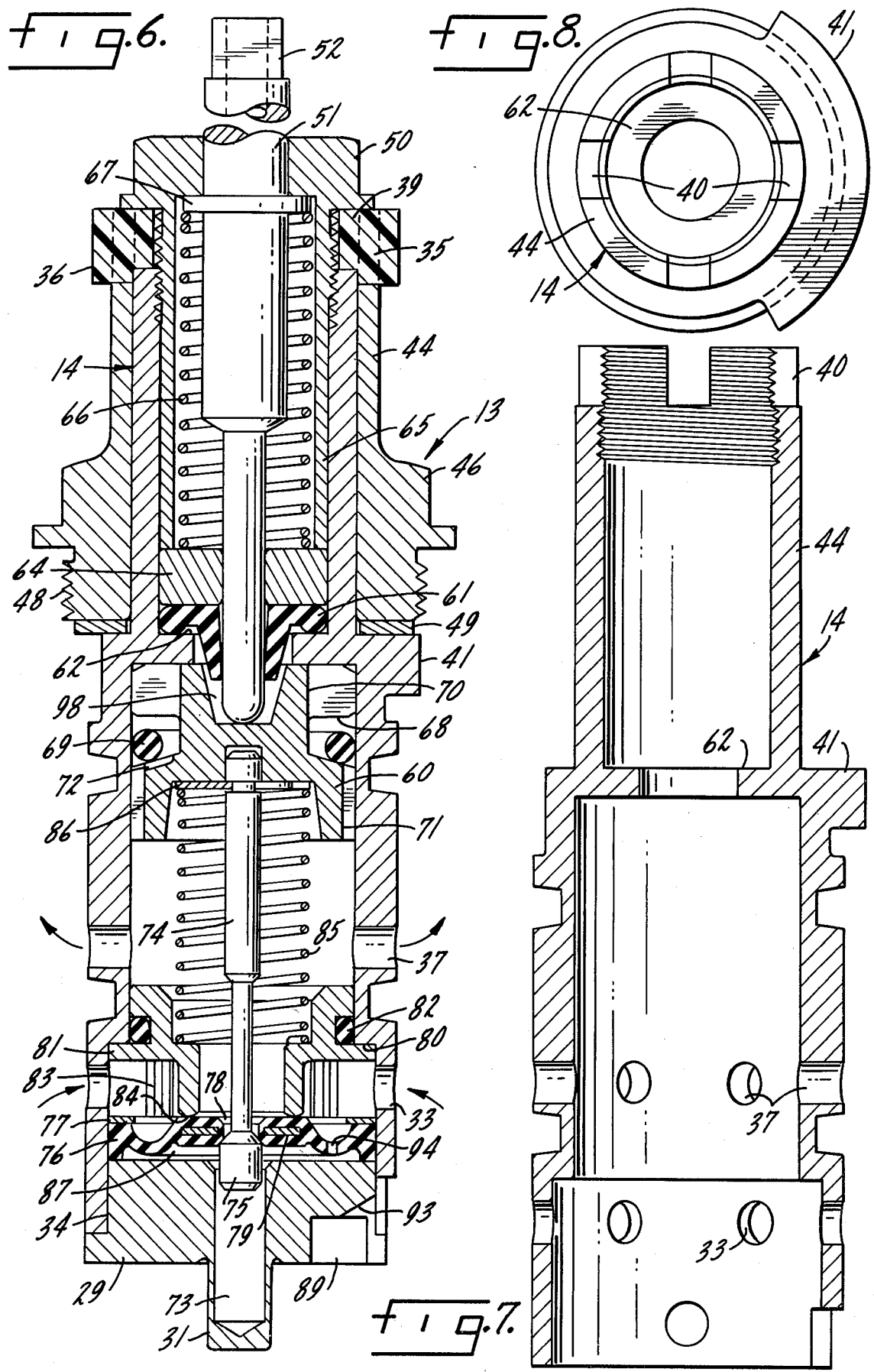

U.S. Patent  Dec. 30, 1980  Sheet 4 of 4  4,241,759
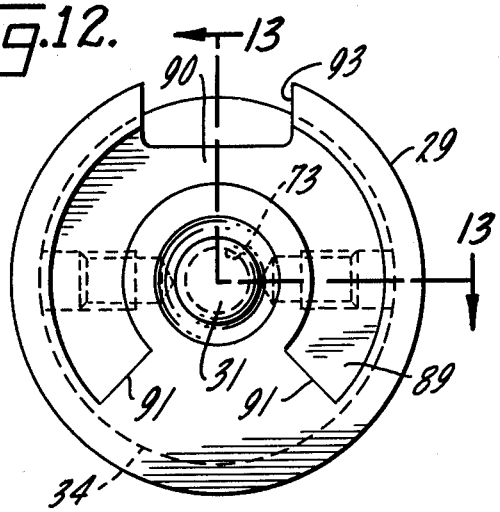
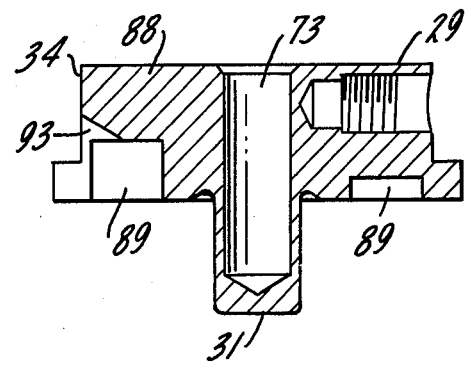
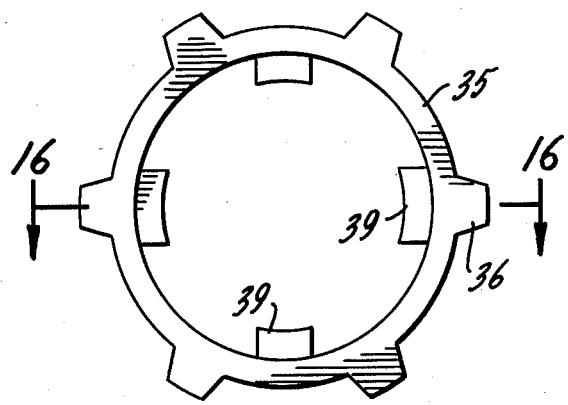
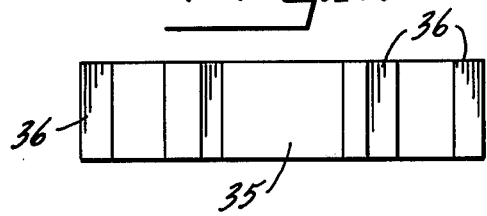
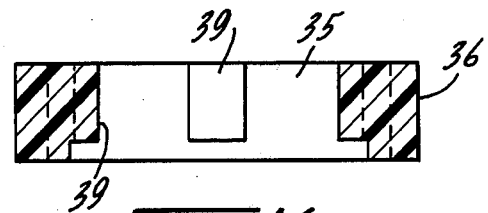
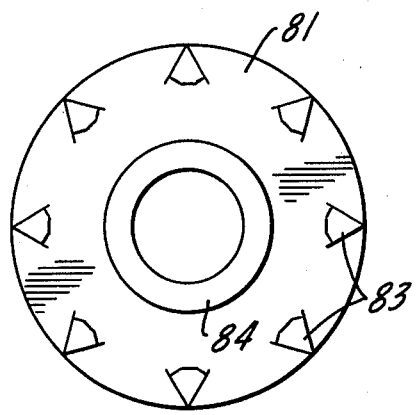

SLOW CLOSING FAUCET

SUMMARY OF THE INVENTION

This invention relates to an actuating mechanism for a faucet or like valve. More particularly, it is concerned with a removable control cartridge for a quick opening self-closing type faucet for use on a lavatory sink, and the principle object of the invention is to design a new and improved faucet of the foregoing type.

Another purpose of the invention is to provide a slow-closing faucet which may also be used as a hot and cold water mixing faucet.

Another object of the invention is to provide a self-cleaning, slow-closing faucet.

Other objects and advantages of the invention will become more apparent in the following specifications, drawings and claims.

BRIEF DESCRIPTION OF THE DRAWINGS

The invention is illustrated in the drawings wherein:

FIG. 1 is a partial cross-sectional side view of the faucet casing and the operating knob;

FIG. 2 is a cross section of the faucet casing only;

FIG. 3 is a top view of FIG. 2 of the faucet casing;

FIG. 4 is a cross-sectional top view of the operating knob, drive collar and faucet cartridge taken along the line 4—4 of FIG. 1;

FIG. 5 is a partial cross section of the faucet casing and check valves, and the control cartridge mounted therein taken along line 5—5 of FIG. 1;

FIG. 6 is an enlarged cross section of the control cartridge taken along the line 6—6 of FIG. 5;

FIG. 7 is a cross section of the control cartridge body only;

FIG. 8 is a top view of the control cartridge body of FIG. 7;

FIG. 9 is a cross-sectional side view of the mixing valve attached at the bottom of the control cartridge;

FIG. 10 is a top view of the piston showing the by-pass slot;

FIG. 11 is a bottom view of the piston of FIG. 10;

FIG. 12 is a bottom view of the mixing valve disk portion;

FIG. 13 is a cross-sectional view of the mixing valve taken along the line 13—13 of FIG. 12;

FIG. 14 is a bottom view of the drive collar;

FIG. 15 is a side view of the drive collar;

FIG. 16 is a cross-sectional side view of the drive collar taken along the line 16—16 of FIG. 14; and FIG. 17 is a bottom view of the diaphragm support.

DESCRIPTION OF THE PREFERRED EMBODIMENT

As shown in FIG. 1, the faucet is designed for conventional use by mounting faucet casing 11 to the back of the lavatory deck (not shown) with the faucet spout 12 overhanging the sink. The control cartridge indicated generally at 13 is removably inserted within the top of casing 11 and is operated by knob 16.

As seen in FIG. 5, casing 11 has cold water inlet 18 and hot water inlet 19 for connection to the cold and hot water supply lines. Directly above each inlet is opening 20, normally covered by nut 21 and sealed by O-ring 22. A ball-shaped check valve 24 is normally biased against the inlets by spring member 25 to prevent the cross flow of water between the cold and hot water supply lines.

A mixing valve 29, responsive to rotation of cartridge core 14, is attached to the bottom of core 14 by means of screws 30 as best seen in FIG. 9. A cylindrical boss 31 extends from the bottom of the mixing valve 29 and is journaled within bore 32 in the bottom of hollow casing 11. A stepped portion 34 at the top of mixing valve 29 is provided for engagement by core 14. Passages 26 and 28 allow communication between casing inlets 18, 19 to mixing valve 29. Above mixing valve 29 are a plurality of core inlets 33 and outlets 37.

An annular drive collar 35, for use in rotating core 14 and mixing valve 29 to select the desired water temperature, is attached to the top of core 14 as seen in FIG. 1. As best seen in FIG. 14, drive collar 35 has a plurality of outwardly extending projections 36 for engagement by a like number of flutes 38 axially extending along the inner surface of cup-shaped operating knob 16. A plurality of inward extending projections 39, for example 4, appear on collar 35 and are positioned to engage recesses 40 at the upper edge of core 14. Thus it can be seen that rotation of operating knob 16 is transmitted by drive collar 35 to cause rotation of core 14 and attached mixing valve 29 to adjust the temperature of the outlet water. To limit the range of rotation, core 14 may be provided with a key portion 41 adjacent a complementary keyway 42 formed in faucet casing. Positioned on a reduced diameter portion 44 of core 14, is bonnet 46 with threads 48 for removably mounting core 14 within casing 11. Thrust washer 49 is provided to reduce the friction between bonnet 46 and core 14 upon rotation. Cover 50 is threaded or otherwise attached to the top end of core 14 and also serves to secure drive collar 35 in place. Axially positioned within core 14 and extending through cover 50 is operating stem 51. The uppermost portion of stem 51 has a square-shaped profile 52 for the mounting of washer 54 as seen in FIG. 1. An axially positioned square-shaped hole 55 mounts the operating knob 16 to stem 51, and is secured thereon by screw 56 and washer 57. A conventional top cap 58 is snapped into the top of knob 16 to enclose screw 56.

Stem 51 extends downward within the interior of core 14 into an operative relationship with piston 60. Positioned around the lower end of stem 51 is seal 61 resting on core inner ledge 62. Guide member 64 is positioned over seal 61 and secured in place by the extending portion 65 of cover 50. Restoring spring 66 normally biases rim 67, formed on stem 51, to a position abutting cover 50.

Piston 60 has an annular groove 68 around its outer surface with "O"-ring 69 loosely positioned therein. A plurality of axially extending upper flutes 70, and lower flutes 71, appear in a spaced relationship around the outer surface of piston 60. By-pass slot 72 is formed on the lower edge of groove 68.

Depending from the bottom of piston 60 is valve stem 74 with valve member 75 formed at its lower end and slidably positioned in axially located bore 73 in mixing valve 29. Adjacent valve member 75 is flexible diaphragm seal 76 which is secured between washer 77 and mixing valve 29. Embedded in diaphragm seal 76 around opening 78 is a reinforcement ring 79. Positioned between washer 77 and shoulder 80 is diaphragm support 81 which is sealed against the inner wall of core 14 by "O"-ring 82. Support 81 has a plurality of triangular-shaped legs 83, and an annular seat 84 adjacent diaphragm opening 78. Restoring spring 85 is positioned between horseshoe-shaped washer 86 and support 81, to normally bias valve member 75 to the closed position shown in FIG. 6.

MIXING VALVE

A disk-shaped portion 88 of mixing valve 29 has tapered mixing groove 89 formed around a portion of its bottom side. As indicated in FIG. 12, mixing groove 89 is deepest at its center 90 and tapers to smaller depths at its ends 91. At center 90 of groove 89 is flow slot 93 axially extending along the outer wall of mixing valve 29. In the mixing operation, the cold and hot water flows through the inlet passages 26,28, respectively, shown in FIG. 5, and enters mixing groove 89 at opposite sides. The hot and cold water meet at flow slot 93 and are mixed together as they flow into lower cavity 92 in faucet casing 11.

The desired water temperature can be selected by rotating knob 16 causing the rotation of mixing valve 29. When the mixing valve is rotated to the left, for example (in FIG. 3), the mixed temperature raises since the depth of the portion of groove 89 over hot water passage 28 becomes greater, allowing the increased flow of hot water. Simultaneously, the depth of the portion of groove 89 over passage 26 is decreased so that the flow of cold water is restricted. If lower temperature water is desired, mixing valve 29 may be rotated in the opposite direction.

The mixed water flows into core inlets 33 and passes through restricted orifice 94 to pressurize chamber 87 located beneath diaphragm 76. Diaphragm 76 is held in the sealing position against seat 84 by the net upward force acting upon diaphragm 76. The upward force is a result of the top surface of diaphragm 76 interior of seat 84, being vented while water pressure beneath the diaphragm acts upwards. Spring 85 also aids in holding diaphragm 76 in a tight sealing position.

FAUCET OPERATION

With a faucet in the normally closed position of FIG. 6, operation is initiated by the depression of knob 16 causing the downward travel of stem 51. The bottom end of stem 51 forces piston 60, stem 74 and valve member 75 to likewise move downward. With valve member 75 spaced away from diaphragm 76, the water in chamber 87 flows upward through center opening 78. Since the entry of additional water into chamber 87 through restricted orifice 94 is at a lower rate than the water flowing out the larger opening at 78, a pressure drop occurs in chamber 87 beneath diaphragm 76. As a result the net pressure forces are now in a downward direction and diaphragm 76 moves away from seat 84. The inlet water is thereby allowed to pass between diaphragm 76 and seat 84 and out core outlets 37. Outlets 37 comunicate with upper cavity 96 in faucet casing 11 as shown in FIG. 5. The water then exits spout 12 for use by the operator, as best seen in FIG. 2.

The outside diameter of "O"-ring 69 is slightly greater than the inside diameter of the chamber in cone 14 thereby effecting a seal. As piston 60 moves down, "O"-ring 69 stays in place or is stationary as the flutes 71 move down away from it until the top of the piston groove 68 engages or picks up the "O"-ring and pushes or carries the "O"-ring down with the piston. Since upper flutes 70 are greater in depth than the thickness of "O"-ring 69, the water is allowed to pass through the upper and lower flutes into dash pot chamber 98 above piston 60. When the user releases the knob, spring 85 forces the piston upward against the pressure of the water in dash pot chamber 98. "O"-ring 69 again stays in place or is stationary as the top of the piston groove 68 moves up until the "O"-ring is engaged or picked up by the upper surface of flutes 71 which thereafter will push the "O"-ring up with the piston. This allows the water to be slowly forced from chamber 98 as it bleeds through the restriction of slot 72. After a predetermined period of time, for example 10 seconds, the piston's upward travel will carry valve member 75 to a position restricting opening 78. With the flow of water through opening 78 now restricted, chamber 87 below diaphragm 76 is repressurized through orifice 94. This causes diaphragm 76 to seat at 84, thereby preventing the further flow of water. If additional water is desired, the user may make another depression of the operating knob.

It is noted that in controlling the closing of the faucet a considerably greater amount of water is displaced than is used by closing mechanisms in previous slow closing faucets. This is because the force for returning piston 60 to its closed position is supplied primarily by the light force of spring 85 rather than the use of diffferential pressure areas. Since a greater amount of water is displaced, piston by-pass slot 72 can be made larger thereby making its tolerance less critical without greatly affecting the timing of the operational cycle. It is further noted that the loose "O"-ring 69 arrangement provides an important self cleaning feature. When piston 60 travels upward, "O"-ring 69 covers by-pass slot 72 forming the desired restriction. However, when piston 60 travels downward, "O"-ring is spaced away from slot 72 allowing any foreign debris to be free to exit slot 72.

The novel invention provides a faucet of the slow closing type delivering water at a selected temperature. The cartridge design allows easy removal for quick repair or replacement when necessary. The timing piston has a self cleaning feature and its enlarged by-pass slot allows less critical manufacturing.

Whereas the preferred form of the invention has been shown and described herein, it should be realized that there may be many modifications, substitutions and alterations thereto.

The embodiment of the invention in which an exclusive property or privilege is claimed is defined as follows:

1. In a slow closing faucet, a hollow casing with a pair of inlets and an outlet therein, a cartridge core having a plurality of inlets and outlets insertable and positioned in the casing, said casing inlets in communication with said core inlets and said core outlets in communication with said casing outlet, a bonnet on the top of the casing holding the core in position in the casing, an operating stem extending through the bonnet into the core and an operating knob attached to the top of the stem for manual manipulation, a cover on the top of the core having an opening through which the operating stem extends, means to hold the operating stem in the core, an inner ledge formed inside the core, a restoring spring positioned between the stem holding means and the inner ledge to normally bias the operating stem towards the cover, a sealing member around the operating stem and resting against the top of the inner ledge with the operating stem extending therethrough, a piston slidably mounted in the core below the inner ledge, a valve stem in the core below the piston and having its upper end in engagement with the underside of the piston, a second spring in the core normally biasing the piston and valve stem upwardly so that the upper end of the piston will be against the bottom of the inner ledge and in engagement with the bottom end of the operating stem, a valve below the piston and operatively related to the lower end of the valve stem for controlling the flow of water between the core inlets and outlets, sealing means around the piston, and a restricted bypass between the sealing means and the piston such that upon manual operation of the knob causing depression of the operating stem, the piston and the valve stem are moved downwardly thereby opening the valve, said sealing means being movable in a chamber formed between said core, said piston and said bottom of said inner ledge to allow unrestricted flow into said chamber, release of said knob allowing said piston to move upwardly, said seal means movable in said chamber to restrict flow out of said chamber only through said restricted bypass, to allow slow closing movement of said faucet.

2. The structure of claim 1 in which the piston has an annular groove formed around its outer surface, the sealing means around the piston being in the form of an "O" ring mounted around the piston and loosely positioned in the annular groove, the bypass including slots formed in the outer surface of the piston and being partially closed by the "O" ring during the slow closing movement of the faucet.

3. The structure of claim 2 further characterized by and including a plurality of generally axially disposed upper and lower flutes on the exterior of the piston above and below the annular groove to thereby provide a flow passage by the piston, the upper flutes having a radial dimension less than the lower flutes and the lower flutes having a radial dimension greater than the diameter of the "O" ring, the slots being formed in the portion of the piston below the annular groove, the "O" ring being slidable to a position away from the lower flutes when the piston is moved downwardly so that water may flow into the chamber and also being slidable to a sealing position adjacent the lower flutes when the dashpot chamber bleeds through the bypass to cause the slow closing action of the faucet.

4. The structure of claim 1 further characterized in that the valve includes a diaphragm sealably attached to said core adjacent said core inlets and having a centrally located opening therein,
    an annular seat adjacent one side of said diaphragm,
    said core having a pressure chamber located adjacent the other side of said diaphragm,
    said valve stem being normally positioned adjacent to and closing said diaphragm opening,
    said diaphragm including orifice means to allow said chamber to become pressurized,
    said pressure in said chamber causing said diaphragm to seat against said seat to prevent the flow of water,
    said valve stem carried by the downward movement of the piston to a spaced position from the diaphragm opening to cause said pressure chamber to be reduced in pressure causing said diaphragm to move away from said seat to permit the flow of water out said core outlets.

5. The structure of claim 4 further characterized by said diaphragm orifice means include a restricted orifice for permitting the flow of water into said pressure chamber.

6. The structure of claim 1 further characterized by said core having a mixing valve attached to the bottom of said core for mixing the water from said faucet inlets, said mixing valve having a generally disk-shaped portion with an axially centered boss extending from the bottom side of said disk portion,
    said casing having an axially centered bore in its bottom inner surface for receiving said boss,
    means for rotating said mixing valve, and
    means in the mixing valve for causing the mixing of the water from said faucet inlets when said core is rotated.

7. The structure of claim 6 further characterized by said means in said mixing valve comprises
    said disk portion having a tapered groove formed in its bottom side, said groove being in communication with said faucet inlets,
    said disk portion having a flow slot axially extending along the outer surface of said disk portion and intersecting said tapered groove to provide communication between said tapered groove and said core inlets,
    said groove having its greatest height adjacent said flow slot and tapering in height as it extends away from said flow slot.

8. The structure of claim 7 further characterized by said means for rotating said mixing valve comprising said core having a plurality of recesses in a spaced relationship formed in its outer surface adjacent its top,
    an annular drive collar positioned around said core and having a plurality of inwardly extending projections in spaced relationship on the inside surface of said collar for engagement with said core recesses, and said collar having a plurality of outward extending projections in spaced relationship on its outer surface,
    said operating knob being cup-shaped and extending over said drive collar and having a plurality of axially extending flutes in spaced relationship on the inner surface of said knob for engagement by said outward projections on said collar, whereby rotation of said knob causes rotation of said collar, said core, and said attached mixing valve, to control the mixing of said hot and cold faucet inlets.

* * * * *